Dec. 19, 1933.          E. H. DARBY          1,939,843
INSULATING METHOD AND PRODUCT THEREOF
Filed Oct. 28, 1927
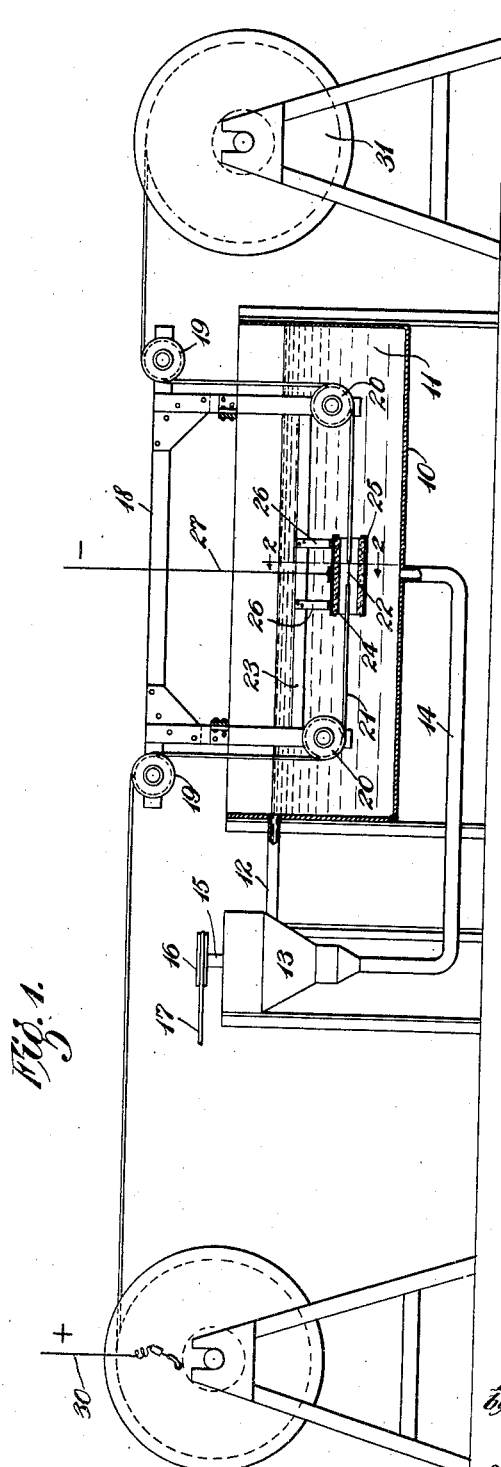
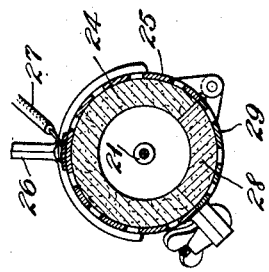
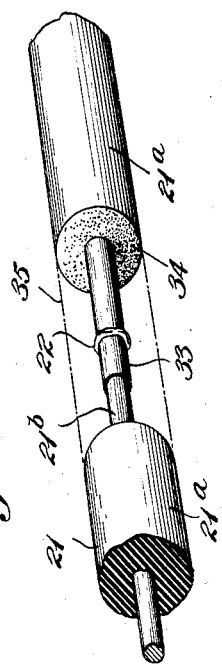
Inventor
Edward H. Darby, dec'd
by Cornelia L. Darby, Ex'trix
By Pierson, Eakin & Avery
Attys.

Patented Dec. 19, 1933

1,939,843

UNITED STATES PATENT OFFICE 1,939,843

INSULATING METHOD AND PRODUCT THEREOF

Edward H. Darby, deceased, late of Rome, N. Y., by Cornelia L. Darby, executrix, Rome, N. Y., assignor to American Anode, Incorporated, New York, N. Y., a corporation of Delaware Application October 28, 1927. Serial No. 229,519

3 Claims. (Cl. 173—268)

This invention relates to a method of insulating, more particularly to the application of insulation to a splice in the ends of the conductors of two lengths of insulated wire, and to the product obtained thereby.

The invention is of primary value in the splicing of wire to be used under conditions requiring absolute protection against leakage of electrical current, which is likely to occur through imperfect insulation, and to afford protection to the splice against corrosion where the insulation thereon is exposed to corrosive fumes or fluids.

The material comprising the splice-insulation is rubber which is obtained from a natural or artificial aqueous dispersion of rubber, such as natural rubber latex admixed with other ingredients in a finely divided state, and the rubber may be applied to splice in any suitable manner, but preferably by the method known as electrophoretic deposition wherein the dispersed particles of rubber in an aqueous dispersion of the same are precipitated upon an anode, the latter in this case comprising the bare conductor wires which are spliced to each other by butt-welding, brazing, or by twisting together.

The invention is applicable to the insulation of splices in wire which has an insulation of compounded rubber extruded thereupon, as well as to wire having an insulation of electro-deposited rubber from a liquid dispersion thereof, and the apparatus required for the practice of the invention is not complex or cumbersome so that it may well be portable to permit the insulation of wire splices at the locale of installation of the wire.

It is an object of this invention to produce insulated wire having a splice therein which is so insulated as to possess superior dielectric and corrosion resisting characteristics as compared with the rubber-taped splices heretofore in use. Another object is to provide a method of applying such insulation to a wire-splice. Other and more detailed objects will be manifest in the following specification.

Of the accompanying drawing:

Fig. 1 is a somewhat diagrammatic side elevation of apparatus adapted to carry out my invention, and the work in operative position therein, parts being in section and broken away.

Fig. 2 is a section on line 2—2 of Fig. 1.

Fig. 3 is a perspective view of a section of wire having a splice therein, before said splice is insulated.

Referring to the drawing 10 is a processing receptacle of suitable capacity and proportions and 11 is a liquid bath therein, the receptacle 10 being provided with an overflow pipe 12 connecting with an impelling device 13, into which the liquid 11 flows by gravity, the impelling device 13 being provided with an outlet pipe 14 connected with the bottom of the receptacle 10 and through which the liquid is returned to the latter, thus keeping the liquid in circulation. The impelling device 13 is provided with an axial shaft 15 having a pulley 16 on its upper end and which is driven by the belt 17 from any suitable source of power, the impeller being designed to circulate the fluid with the minimum of agitation to avoid causing flocculation or agglomeration of the dispersed particles therein.

The liquid bath 11 comprises a natural or artificial aqueous dispersion of rubber such as rubber latex and admixed with other ingredients in a finely divided state, such as a vulcanizing agent and an accelerator therefor, which will effect the vulcanization of the rubber at relatively low temperature and in a relatively short interval of time. By keeping the dispersion in circulation as by the apparatus described, the tendency of the dispersed particles therein to separate out and float or precipitate, due to differences of specific gravity, is counteracted and the colloidal homogeneity of the dispersion is maintained.

For supporting the work within the receptacle 10 there is provided a generally rectangular metal frame 18 which is adapted to rest upon the upper margins of the receptacle 10 with the lower portion of its structure submerged in the liquid bath therein. Respective sheaves 19, 19 are journaled at the upper corners of the frame 18, and sheaves 20, 20 are journaled at the lower corners thereof within the bath 11, the arrangement being such that when the work, comprising an insulated wire 21 having a brazed or welded splice 22 therein, is passed around the sheaves 19, 20, 20, 19 in the order named, there will be formed a bight in the wire of which that portion between the sheaves 20, 20 and which includes the splice 22, will be submerged in said bath.

The frame 18, or at least that portion thereof which is submerged in the liquid dispersion 11, and the sheaves 20, 20 either are covered with vulcanized rubber or are made of metal which is immune from corrosion by the liquid ingredients of the bath, such a metal for example being the so-called "stainless steel" which embodies an alloy of chromium.

Suspended in the liquid bath 11 from a brace 23 comprising a portion of the frame 18, is a cathode structure comprising a tubular, permeable, ceramic cathode diaphragm 24 and a foraminous metallic cathode 25 closely embracing the same, said cathode being secured to the brace 23 by the arms 26, 26, and is connected to the negative pole of a source of electrical current by a power conductor 27. The position of the cathode structure on the frame 18 is such that the cathode diaphragm 18 surrounds a portion of the wire 21 between the sheaves 20, and said cathode diaphragm is formed with a removable longitudinal section 28 in juxtaposition with a hinged and latched longitudinal section 29 in the cathode 25 to permit the wire 21 easily and quickly to be mounted within the cathode diaphragm, which is particularly advantageous where the splice 22 to be insulated is at an intermediate position in a long length of wire.

The anode, upon which the dispersed rubber particles of the liquid bath 11 are deposited, is the bare conductor of the wire 21 at the splice 22 therein, one of the free ends of said wire being attached to the positive pole of the source of electrical current represented by the conductor 30. In the embodiment of the invention shown in Fig. 1 the splice 22 connects the ends of two lengths of wire carried on respective reels 31, 32 which are suitably positioned or journaled at opposite ends of the insulating apparatus, the free end of the wire being brought through the sidewall of one of the reels so as to permit attachment to said conductor 30.

Preferably the wire-splice 22 is given preliminary treatment before insulation is deposited thereon, as is best shown in Fig. 3 wherein the wire-insulation designated 21$^a$ is cut off substantially square at a short distance each side of the splice 22, and the latter and the bare-conductor wire, designated 21$^b$, are coated with a layer of zinc 33 which may be applied by electrolytic or other suitable method. Also the square-cut ends of the insulation 21$^a$ are treated with a coating of suitable rubber cement such as the coating 34. The preliminary treatment described is for the purpose of improving the adhesion between the conductor wire 21$^b$ and its insulation 21$^a$ and the splice-insulation subsequently deposited thereon.

In the practice of the invention the spliced wire is given the preliminary treatment aforementioned, and then is threaded around the sheaves 19, 20 of the frame 18 and through the cathode structure thereon, the splice 22 being positioned within said cathode. The frame 18 is raised from the bath 11 during this operation so that the sheaves 20 are not caused to rotate therein and thus cause flocculation or agglomeration of solid particles of the dispersion comprising said bath.

Electrical current being applied through the power-conductors 27, 30 cataphoretic action of the electric field between the cathode 25 and the anode comprising the splice 22 and adjacent exposed conductor wire causes the negatively charged rubber particles in the dispersion 11 to migrate toward said anode and deposit thereupon. The operation is continued until the deposit, designated 35, attains the desired thickness which is flush with the wire-insulation 21$^a$ as indicated by the broken lines in Fig. 3, or somewhat larger, after which the electrical current is discontinued and the wire removed from the bath.

Dispersed rubber which has been deposited upon an article in the manner aforesaid contains a substantial percentage of moisture or liquid which requires to be removed therefrom before the deposit can be vulcanized. The liquid may be removed from the deposit in any suitable way, usually in two operations of which the major portion of the liquid is removed in the first operation and the deposit thoroughly dried by the second operation. For example, the insulated splice may be submerged in an electrolytic bath and electrically connected to cause removal of the major portion of the liquid by electro-endosmose. The remainder of the moisture may be removed by heating the deposit which may be effected from within by induced electrical currents.

The vulcanization of the deposit 35 will be effected without further treatment, at ordinary temperature and in a relatively short interval of time provided a suitable accelerator is used in the dispersion. If immediate vulcanization is desired the deposit may be subjected to heat as by induced electrical current through the conductor 21$^b$, or by press-curing in a heated mold.

The apparatus herein illustrated and described comprises no part of the present invention and may be variously modified as desired, and it will be understood that one may depart from the exact procedure described within the limits of the appended claims.

It is claimed:

1. The method of insulating a splice in rubber-insulated wire, which comprises squaring the rubber insulation on either side of the splice, coating the cut surfaces of the rubber insulation with cement, coating the exposed metal of the wire with zinc, electrodepositing rubber thereon from an aqueous dispersion of rubber, and drying and vulcanizing the electrodeposited rubber, whereby a smooth, compact layer of rubber insulation, firmly united to the old insulation, is formed over the splice.

2. The method of insulating a splice in rubber insulated wire which comprises squaring the rubber insulation on either side of the splice, coating the cut surfaces of the rubber insulation with cement, depositing rubber on the wire in a layer of progressively increasing thickness from an aqueous dispersion of rubber until the quantity thereof is substantially equal to that of the old insulation, and drying the deposited rubber, whereby a smooth, compact layer of rubber insulation, firmly united to the old insulation, is formed over the splice.

3. The method of insulating a splice in rubber insulated wire which comprises squaring the rubber insulation on either side of the splice, coating the cut surfaces of the rubber insulation with cement, depositing rubber on the wire in a layer of progressively increasing thickness from an aqueous dispersion of rubber until the quantity thereof is substantially equal to that of the old insulation, and drying and vulcanizing the deposited rubber, whereby a smooth, compact layer of rubber insulation, firmly united to the old insulation, is formed over the splice.

CORNELIA L. DARBY,
*Executrix of the Estate of Edward H. Darby, deceased.*